United States Patent
Lu

(10) Patent No.: US 12,350,603 B1
(45) Date of Patent: Jul. 8, 2025

(54) LUMINOUS BUILDING BLOCK

(71) Applicant: Yingjin Lu, Shantou (CN)

(72) Inventor: Yingjin Lu, Shantou (CN)

(*) Notice: Subject to any disclaimer, the term of this patent is extended or adjusted under 35 U.S.C. 154(b) by 0 days.

(21) Appl. No.: 19/026,028

(22) Filed: Jan. 16, 2025

(51) Int. Cl.
 *A63H 33/04* (2006.01)
 *A63H 33/08* (2006.01)
 *F21V 23/02* (2006.01)
 *F21V 23/04* (2006.01)
 *F21V 33/00* (2006.01)
 *H01M 50/109* (2021.01)

(52) U.S. Cl.
 CPC ......... *A63H 33/042* (2013.01); *A63H 33/046* (2013.01); *A63H 33/088* (2013.01); *F21V 23/023* (2013.01); *F21V 23/04* (2013.01); *F21V 33/008* (2013.01); *H01M 50/109* (2021.01)

(58) Field of Classification Search
 CPC ............................ A63H 33/042; A63H 33/046
 USPC ....................................................... 446/91, 92
 See application file for complete search history.

(56) References Cited

U.S. PATENT DOCUMENTS

| | | | | |
|---|---|---|---|---|
| 6,299,072 B1* | 10/2001 | Burns | .................... | A63H 19/30 104/53 |
| 7,066,778 B2* | 6/2006 | Kretzschmar | ........ | A63H 33/046 446/124 |
| 7,255,624 B2* | 8/2007 | Daftari | .................... | A63H 33/22 446/485 |
| 7,322,873 B2* | 1/2008 | Rosen | .................. | A63H 33/046 446/124 |
| 7,846,002 B1* | 12/2010 | Mikesell | .............. | A63H 33/042 446/92 |
| 8,079,890 B2* | 12/2011 | Seligman | ............. | A63H 33/086 446/124 |
| 9,320,980 B2* | 4/2016 | Schweikardt | ........ | A63H 33/046 |
| 9,472,112 B2* | 10/2016 | Schweikardt | ......... | A63H 33/04 |
| 9,861,906 B1* | 1/2018 | Calvert | ................. | A63H 33/086 |
| 10,047,940 B2* | 8/2018 | Grunzweig | ............... | F21S 2/00 |
| 10,376,804 B2* | 8/2019 | Lu | ......................... | F21V 23/001 |
| 10,456,905 B2* | 10/2019 | Shin | .......................... | B25J 9/08 |
| 10,625,173 B2* | 4/2020 | Kærsgaard | ........... | A63H 33/086 |
| 12,151,182 B2* | 11/2024 | Chen | ..................... | A63H 33/046 |
| 2003/0148700 A1* | 8/2003 | Arlinsky | .................. | G09B 1/40 446/91 |
| 2015/0065007 A1* | 3/2015 | Klepper | ............... | A63H 33/046 446/92 |
| 2019/0105579 A1* | 4/2019 | Karunaratne | ......... | G06F 3/0393 |
| 2023/0075484 A1* | 3/2023 | Wellejus | ................. | A63H 3/28 |
| 2025/0041753 A1* | 2/2025 | Chen | ..................... | A63H 33/046 |

* cited by examiner

*Primary Examiner* — Joseph B Baldori
(74) *Attorney, Agent, or Firm* — Murray, Ziel & Johnston; Aaron Powell

(57) ABSTRACT

A luminous building block is provided with a luminous unit and a power supply module. The power supply module is used to supply power to the luminous unit. The said luminous building block glows without an external power source.

5 Claims, 6 Drawing Sheets

LUMINOUS BUILDING BLOCK

TECHNICAL FIELD

The present invention belongs to the technical field of building blocks, and particularly relates to a luminous building block.

TECHNICAL BACKGROUND

In order to increase the fun of playing building block, building blocks with a power supply bottom base to be luminous comes to the market. When the building blocks are placed on the power supply bottom base, the power supply bottom base can supply power to make the building blocks with lighting effect, thereby attracting children's attention and make it more fun to play building blocks.

However, the luminous function of the building blocks needs to rely on the power supply bottom base. Once the building blocks are separated from the bottom base, they cannot glow. Thus, there are limitations in use of the building blocks which rely on the power supply bottom base.

INVENTION CONTENT

In order to overcome the defects of the existing technology, the present invention provides a luminous building block, which can glow without an external power supply.

The technical scheme adopted by the present invention for solving the technical problems is as follows:

A luminous building block is provided with a luminous unit and a power supply module inside, and the power supply module is used to supply power to the luminous unit.

Further, magnetic parts are also arranged inside the luminous building block to make the building block attract on other components.

Further, the power supply module is a button battery.

Further, the building block includes a housing. The interior of the housing is provided with at least two installment cavities, and the magnetic parts is arranged inside the installment cavities. At least one installment cavity is respectively located at the top side and the bottom side of the housing.

Further, the housing includes an square hollow column, a top cover and a bottom cover. Two ends of the square hollow column are provided with openings, and the top cover and the bottom cover can respectively close the openings at the two ends of the square hollow column. The luminous unit and the magnetic parts are both arranged on the square hollow column.

Further, the top cover and the bottom cover are respectively detachably connected to the square hollow column.

Further, the interior of the square hollow column is provided with a first division plate dividing the square hollow column into two spaces. Two sides of the first division plate are provided with a number of second division plates. One second division plate encloses around an angle side wall of the square hollow column to form one installment cavity, where the magnetic parts are arranged.

Further, the top cover is provided with a pressing area, and the interior of the square hollow column is provided with a switch, which is used to turn on or off the luminous unit. The pressing area located above the switch can be elastically movable relative to the top cover to trigger the switch.

Further, the pressing area and the top cover are integrally formed, and a hollow-out groove is arranged between a portion of the pressing area and the top cover.

Further, a connection plate is further arranged inside the luminous building block. The interior of the square hollow column is provided with supporting columns used to support the connection plate.

The beneficial effects of the present invention:

The present invention provides a luminous building block, which can glow without an external power supply through its built-in power supply module and luminous unit; it gives users a better enjoyment when playing the luminous building blocks without troubled by the electronic wires. In addition, by arranging magnetic parts inside, the present invention application provides a king of luminous building blocks that can attracted and fix on external objects, which makes the luminous building blocks connected with each other more stable, and also provides more variety for users when playing the luminous building blocks.

1—building block; 11—square hollow column; 111—first installment hole; 112—second installment hole; 113—first division plate; 114—second division plate; 115—supporting column; 12—top cover; 121—first installment column; 122—pressing area; 123—hollow-out groove; 13—bottom cover; 131—second installment column;

2—connection plate; 21—switch; 22—luminous unit; 23—power supply module;

3—installment cavity; 31—magnetic part.

DETAILED DESCRIPTION OF THE EMBODIMENTS

Below is a further detailed description of the present invention based on the figures.

The present embodiment only shows an explanation of the present invention and it is not a limitation to the present invention. The skilled in the art can make modifications to this embodiment as needed without making any creative contributions after reading this specification, which are always protected by the patent law as long as they are within the scope of the claims of the present invention.

It should be noted that when an element is called as being "fixed to" or "arranged on" another element, it can be directly on the other element or indirectly on the other element. When an element is called as being "connected to" another element, it can be directly connected to the other element or indirectly connected to the other element.

It should be noticed that the terms "length", "width", "above", "below", "front", "rear", "left", "right", "vertical", "horizontal" "top", "bottom", "inside" and "outside" which indicates the orientations or positional relationships are based on the orientations or positional relationships shown in the figures. They are only for facilitating describing the present invention and simplifying the description, rather than indicating or implying that the device or component must have a specific orientation, construct and operate in a specific orientation, therefore, it understood as a limitation of the present invention.

In addition, the terms "first" and "second" are used for descriptive purposes only and cannot be understood as indicating or implying relative importance or implicitly indicating the quantity of indicated technical features. Therefore, a feature defined as "first" and "second" may explicitly or implicitly include one or more of these features. In the description of the present invention, "a plurality of" means two or more, unless otherwise specifically defined.

Figure 1:
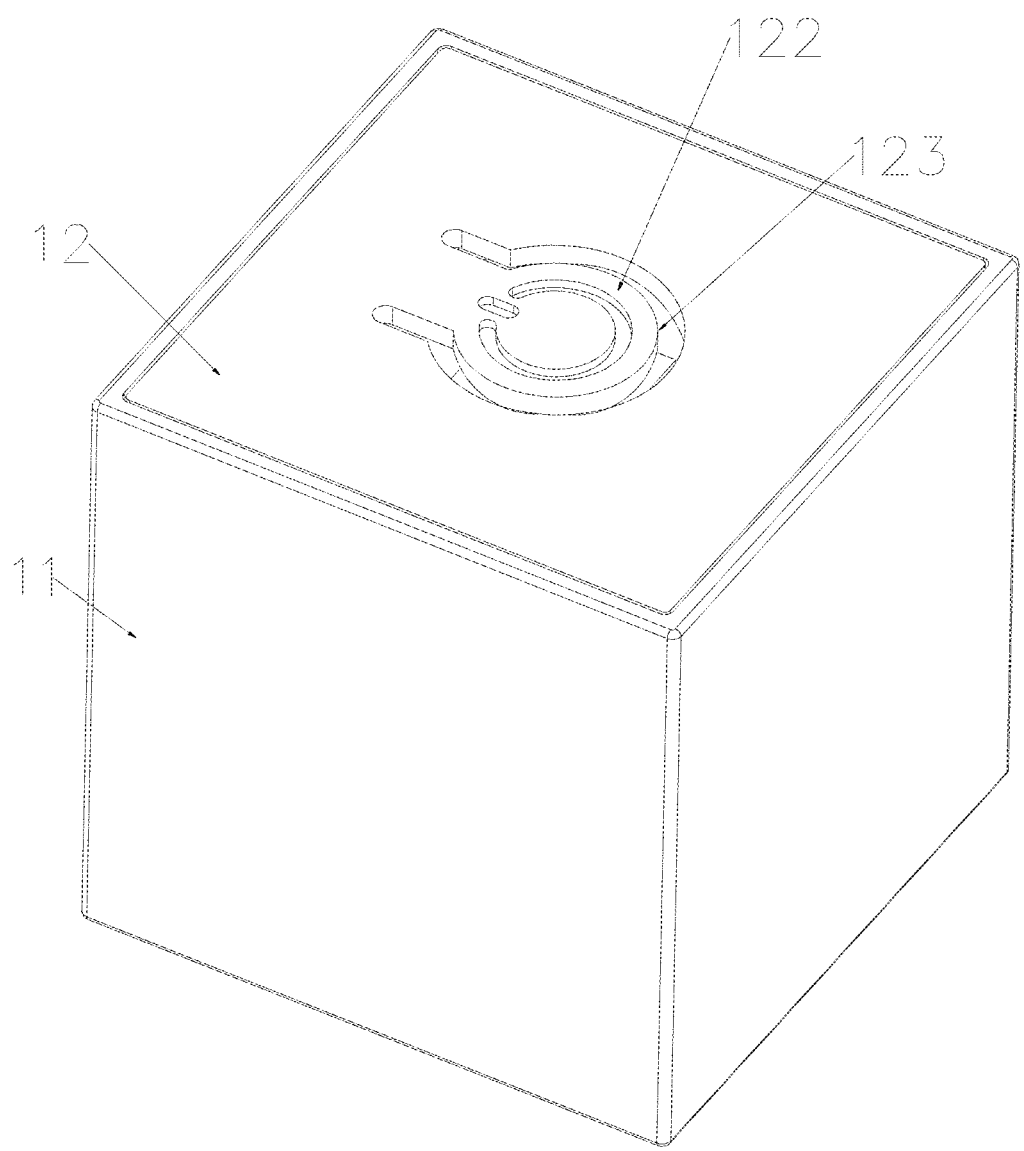
FIG. 1 is an axonometric view of a building block provided by the present invention.
Figure 2:
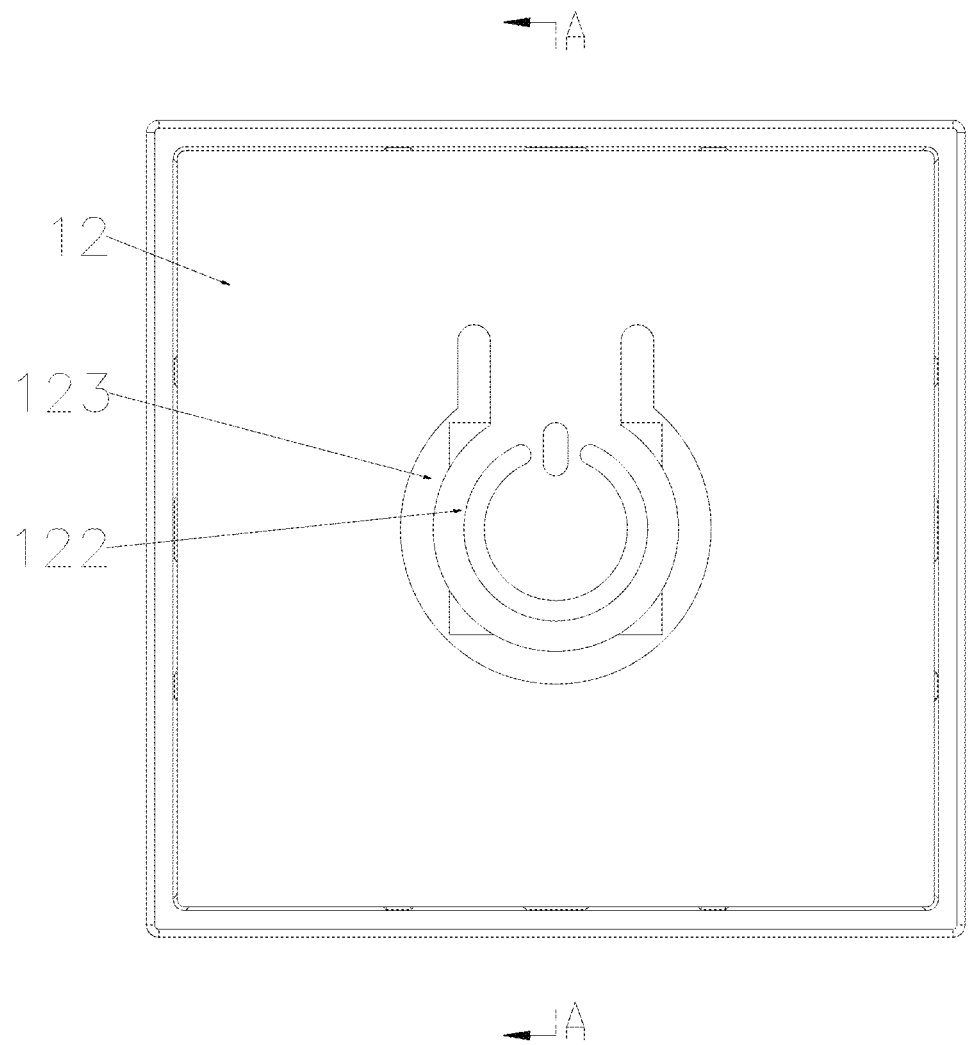
FIG. 2 is a top view of the building block provided by the present invention.
Figure 3:
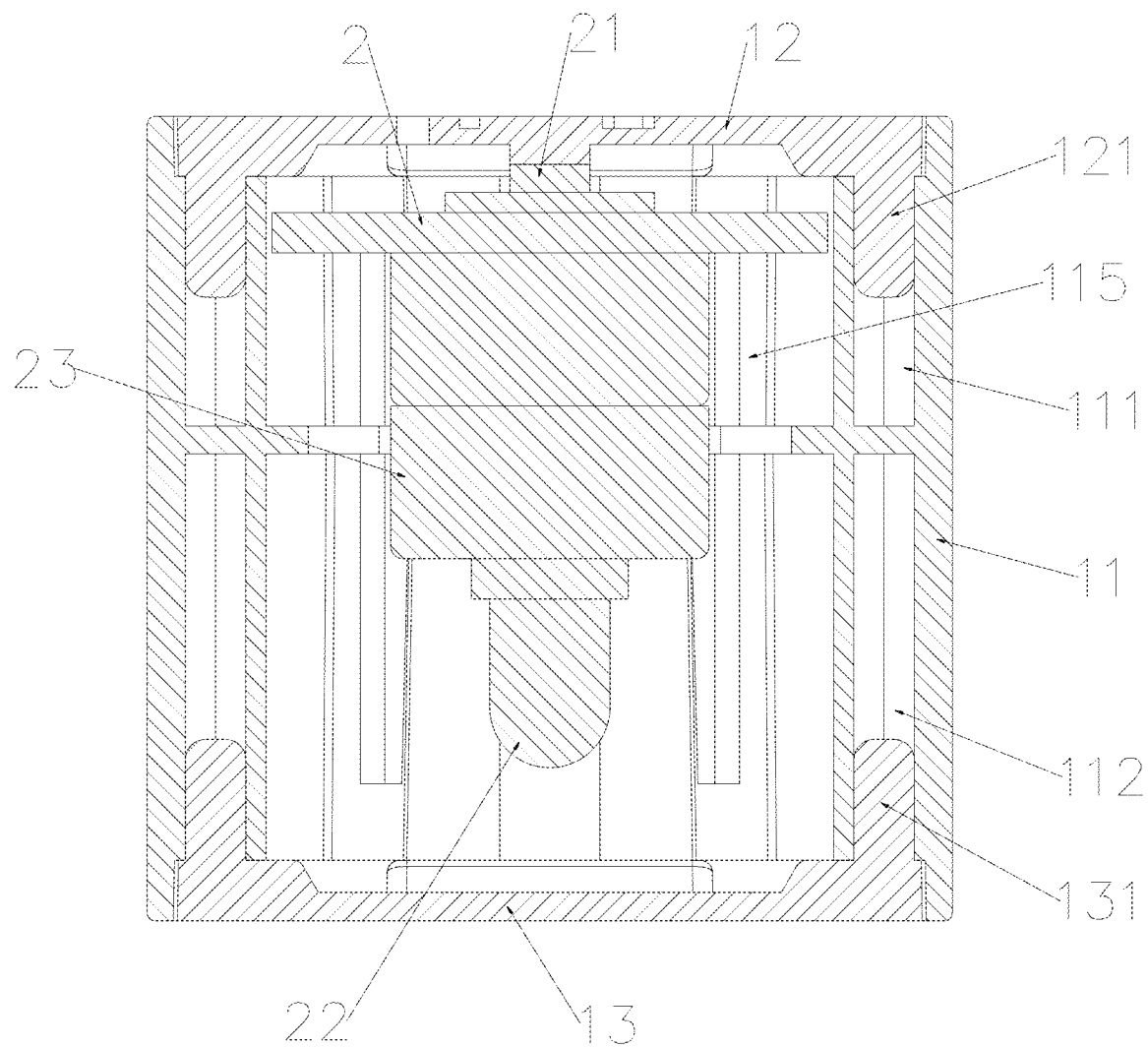
FIG. 3 is a cross-sectional view along the line A-A in FIG. 2.
Figure 4:
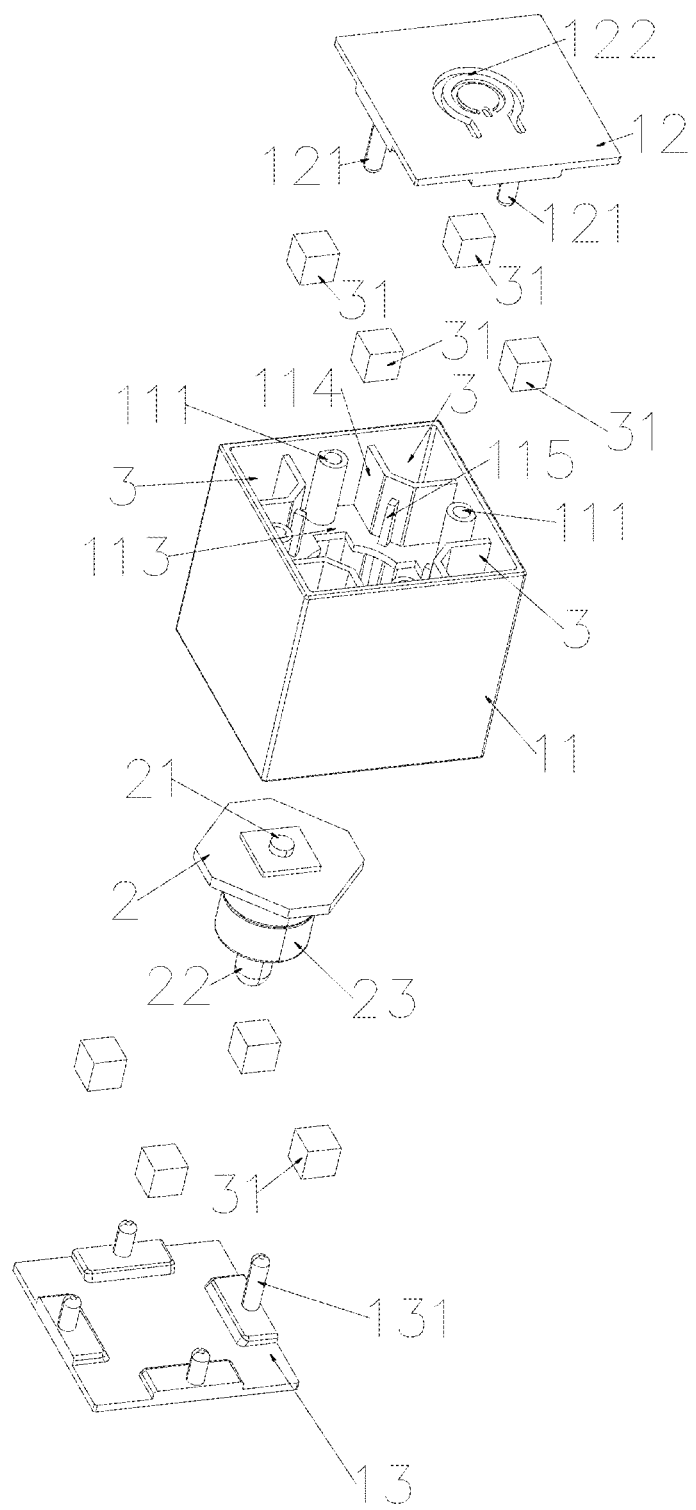
FIG. 4 is an exploded view of the building block provided by the present invention.
Figure 5:
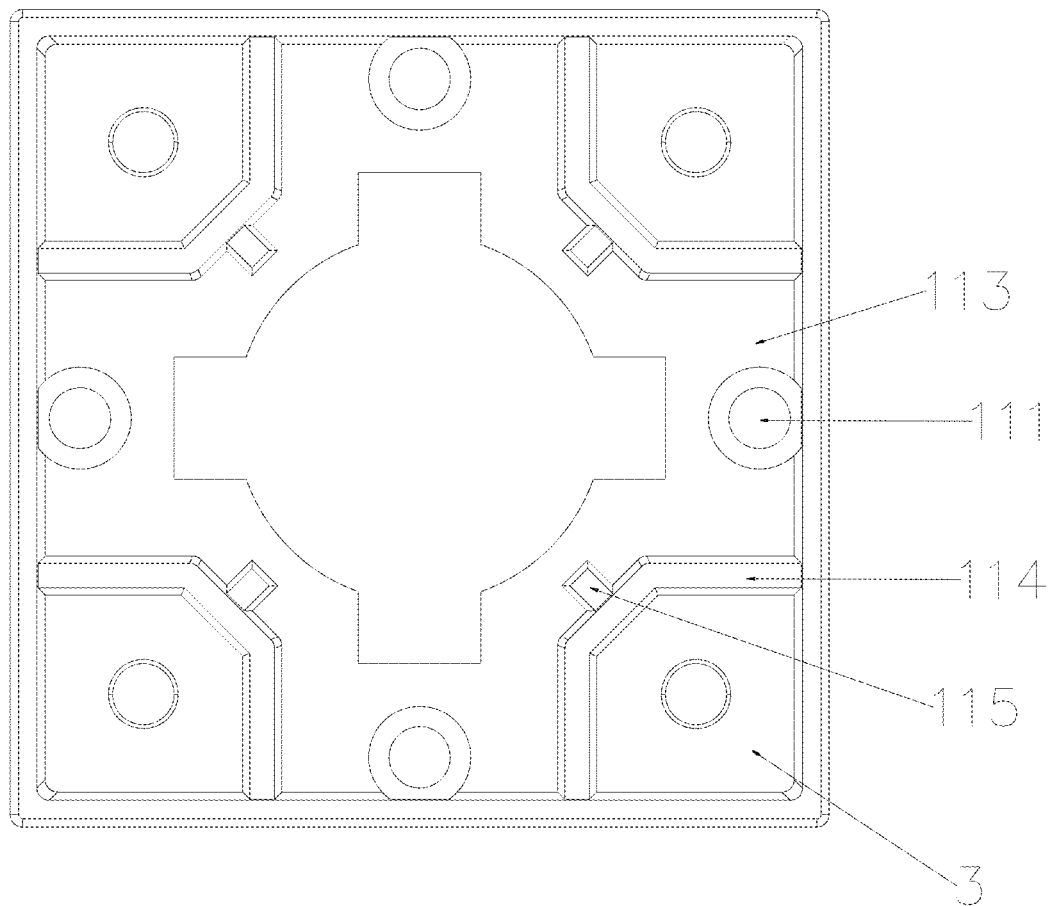
FIG. 5 is a schematic view of an square hollow column of the building block provided by the present invention.
Figure 6:
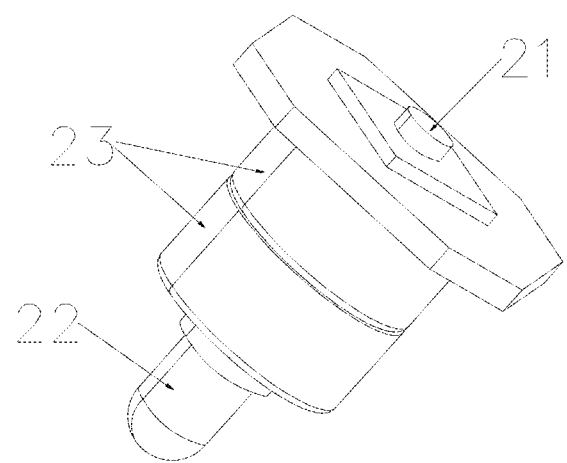
FIG. 6 is a schematic view of a luminous unit provided by the present invention.

Referring to FIGS. 1 to 6, this embodiment provides a luminous building block 1, which is provided with a luminous unit 22 and a power module 23 inside. The power supply module 23 is used to supply power to the luminous unit 22, so that the building block 1 can glow without an external power supply.

Further, magnetic parts 31 are also arranged inside the building block 1 to make the building block 1 attract on other components. The other components here include other building blocks 1 with magnetic attraction function or metal material objects.

Preferably, the building block 1 includes a housing. The interior of the housing is provided with at least two installment cavities 3, and the magnetic parts 31 is arranged inside the installment cavities 3. At least one installment cavity 3 is respectively located at a top side and a bottom side of the housing.

Understandably, the top side and the bottom side of the housing are both provided with magnetic parts 31 to make it easier for users to have the building block 1 attracted other components.

Preferably, the magnetic force of the magnetic parts 31 located at the top side of the housing is opposite to that of the magnetic parts 31 located at the bottom side of the housing.

When users splice multiple building blocks 1 together, the ends of the two building blocks 1 with different magnetism must be brought close together so that they can attract each other. If the ends of the two building blocks 1 with the same magnetism are brought close together, they cannot attract together. By designing the magnetism of the building blocks 1, users need to follow specific steps to make multiple building blocks 1 forming a specific shape or figure. It makes playing building block 1 game more challenging and interesting.

Preferably, the power supply module 23 is a button battery. By arranging a button battery inside the building block 1 to supply power to the luminous unit 22, the building block 1 can glow without electronically connected to an external power source.

Preferably, the housing includes a square hollow column 11, a top cover 12 and a bottom cover 13. Two ends of the square hollow column 11 are provided with openings. The top cover 12 and the bottom cover 13 can respectively close the openings at the two ends of the square hollow column 11. The luminous unit 22 and the magnetic parts 31 are both arranged on the square hollow_column 11.

By arranging the top cover 12 and the bottom cover 13 to close the openings of the square hollow column 11, the luminous unit 22 and the magnetic parts 31 can be retained in the square hollow column 11 to prevent the loss of internal components.

Preferably, the top cover 12 and the bottom cover 13 are respectively detachably connected to square hollow column 11.

When the power supply module 23 runs out of power or the luminous unit 22 is broken, the luminous unit 22 will no longer glow. The detachable top cover 12 and bottom cover 13 allow users to open the square hollow column 11 and replace the power supply module 23 or luminous unit 22 in time.

Further, the top cover 12 is provided with four first installment columns 121, the bottom cover 13 is provided with four second installment column 131. The two ends of the square hollow column 11 are respectively provided with four first installment holes 111 and four second installment holes 112. The first installment columns 121 are adapted to the first installment holes 111, and the second installment columns 131 are adapted to the second installment holes 112, so as to connect the top cover 12 and the bottom cover 13 to the square hollow column 11 respectively.

Preferably, the interior of the square hollow column 11 is provided with a first division plate 113 dividing the square hollow column 11 into two spaces. Two sides of the first division plate are provided with a number of second division plates. One second division plate 114 encloses around the angle side wall of the square hollow column 11 to form one installment cavity 3, where the magnetic parts 31 are arranged.

In this embodiment, four second division plates 114 are arranged on the same side of the first division plate 113 to enclose around the four angles side wall of the square hollow column 11 to form four installment cavities 3. The four installment cavities 3 correspond to the four corners of the square hollow column 11 respectively. The magnetic parts 31 are arranged in the installment cavities 3 to make the magnetic force of the building block 1 evenly distributed so that the building block 1 can be stably attracted on other components.

When the top cover 12 and the bottom cover 13 are connected to the square hollow_column 11, the installment cavities 3 are closed. The magnetic parts 31 are closely locked inside the square hollow column 11, thereby ensuring that the magnetic attraction points are fixed.

A through hole is arranged in the center of the first division plate 113 for the luminous unit 22 to pass through. The size of the through hole is larger than that of the luminous unit 22 so that the luminous unit 22 can illuminate two spaces inside divided by the first division plate 113 at the same time.

Preferably, the square hollow column 11, the top cover 12 and the bottom cover 13 are all made of a light-transmitting material, which allows the light source inside the building block 1 to penetrate better, which make the building block 1 glow better, more evenly and brightly as a whole, so as to enhance the visual appeal.

Preferably, the top cover 12 includes a pressing area 122. The interior of the square hollow column 11 is provided with a switch 21, which is used to turn on or off the luminous unit 22. The pressing area 122 is located above the switch 21, and the pressing area 122 can elastically move relative to the top cover 12 to trigger the switch 21.

Further, the pressing area 122 and the top cover 12 are integrally formed, and a hollow-out groove 123 is arranged between a portion of the pressing area 122 and the top cover 12.

Understandably, users can trigger the switch 21 through the pressing area 122 to switch the luminous unit 22 between turning on and off.

Further, the pressing area 122 and the top cover 12 are both made of elastic material, such as plastic material. By utilizing the elasticity of the plastic material, the pressing area 122 will elastically return to the initial state when no external force is applied on the pressing area.

It should be noted that the switch 21 in this embodiment is a self-locking switch, which is a common button switch. When the switch 21 is pressed for the first time, the switch 21 is turned on and maintained. That is, self-locking. When the switch 21 is pressed for the second time, the switch 21 is turned off and pops out. It can be seen that users can keep the luminous unit 22 on by pressing it once, and the luminous unit 22 can be turned off by pressing it for the second time.

Preferably, a connection plate 2 is further arranged inside the luminous building block 1. The interior of the square hollow column 11 is provide with supporting columns 115 used to support the connection plate 2. The luminous unit 22, the power supply module 23 and the switch 21 are all arranged on the connection plate 2.

Specifically, the supporting columns 115 are arranged on one side of the second division plate 114 facing the center of the square hollow column 11. Each second division plates 114 is provided with a support column 115. A plurality of supporting columns 115 together support the connection plate 2. When the top cover 12 is connected to the installment cover 11, the top cover 12 and the supporting columns 115 jointly clamp and fix the connection plate 2 to ensure that the connection plate 2 does not shake.

Based on the above description, the luminous building block 1 provided in this embodiment can glow without an external power supply but only through its built-in power supply module 23 and the luminous unit 22. It provides users a better experience when play the luminous building blocks without troubles from electronic wires. In addition, the present embodiment provides a building block 1 with magnetic parts 31 can attract an external object, which give more variety in playing. The building blocks connect with each other more stably.

It could be understood that under the guidance of the above embodiments, those skilled in the filed can combine various implementation methods in the above embodiments to obtain technical solutions of multiple implementation methods.

The above description is only a preferred embodiment of the present invention and is not to limit the present invention. Any modifications, equivalent substitutions and improvements made within the spirit and principles of the present invention should be included in the protection scope of the present invention.

The invention claimed is:

1. A luminous building block, comprises a housing, a luminous unit and a power supply module, wherein the power supply module is used to supply power to the luminous unit; and a plurality of magnetic parts are arranged inside the building block to make the building block attract on other components; the housing is divided into at least two installment cavities, and the magnetic parts are arranged inside the two installment cavities; at least one installment cavity is respectively located at a top side and a bottom side of the housing; the housing comprises a square hollow column, a top cover and a bottom cover; wherein two ends of the square hollow column are provided with openings; the top cover and the bottom cover can respectively close the openings at the two ends of the square hollow column; the luminous unit and the magnetic parts are arranged inside the square hollow column; wherein the top cover is provided with a pressing area; the square hollow column is provided with a switch used to turn on or off the luminous unit; the pressing area located above the switch can be elastically movable relative to the top cover to trigger the switch; a connection plate is further arranged inside the luminous building block; the interior of the square hollow column is provided with a plurality of supporting columns used to support the connection plate.

2. The luminous building block according to claim 1, wherein the power supply module is a button battery.

3. The luminous building block according to claim 1, wherein the top cover and the bottom cover are detachably connected to the installment cover respectively.

4. The luminous building block according to claim 1, wherein the interior of the installment cover is provided with a first division plate dividing the installment cover into two spaces; two sides of the first division plate are provided with a number of second division plates; one second division plate encloses around an angle side wall of the installment cover to form one installment cavity, where the magnetic parts are arranged.

5. The luminous building block according to claim 1, wherein the pressing area and the top cover are integrally formed; a hollow-out groove is arranged between a portion of the pressing area and the top cover.

\* \* \* \* \*